United States Patent [19]

Skoda

[11] Patent Number: 4,614,503
[45] Date of Patent: Sep. 30, 1986

[54] INDIVIDUALLY FITTED GAME CALL

[76] Inventor: Jerald T. Skoda, 603 Franklin St., Decorah, Iowa 52101

[21] Appl. No.: 711,230

[22] Filed: Mar. 13, 1985

[51] Int. Cl.$^4$ ............................................. A63H 5/00
[52] U.S. Cl. ................................. 446/213; 446/176; 446/202; 84/330
[58] Field of Search ............... 446/202, 203, 207, 208, 446/209, 213, 216, 176; 84/330, 453

[56] References Cited

U.S. PATENT DOCUMENTS

| | | | |
|---|---|---|---|
| 805,817 | 11/1905 | Pardoe | 446/204 |
| 1,367,176 | 2/1921 | Bridges | 446/202 |
| 2,745,215 | 5/1956 | Puckette | 446/202 |
| 2,833,086 | 5/1958 | Johenning | 446/202 |
| 2,969,611 | 1/1961 | Warren, Jr. | 446/202 |
| 3,583,094 | 6/1971 | Tribell et al. | 446/202 |
| 3,722,133 | 4/1973 | Morgan | 446/202 |
| 3,738,056 | 6/1973 | Schultz | 446/202 |
| 3,811,221 | 5/1974 | Wilt | 446/202 |
| 3,815,283 | 6/1974 | Piper | 446/202 |
| 4,218,845 | 8/1980 | Evans et al. | 446/202 |
| 4,483,097 | 11/1984 | Piper | 446/207 |

Primary Examiner—F. Barry Shay
Attorney, Agent, or Firm—Ronald M. Anderson

[57] ABSTRACT

The subject invention is a game call that is individually fitted to the user. One embodiment includes a molded plastic frame having an inverted "U" shaped channel in which a thermal plastic insert molded to fit the user's incisor teeth is retained. In a second embodiment, a thermal plastic strip is molded around part of the frame and is fitted between the user's incisor teeth and lip. The user may do the molding, which is carried out at relatively low temperatures. Adjoining either channel portion of the frame in the first embodiment, or the portion on which the molded strip is fitted in the second embodiment, is a planar arcuate shaped groove adapted to hold an elastic diaphragm. The call is held in the user's mouth with one surface of the diaphragm disposed adjacent the user's lip. As air is expelled from the user's mouth over the diaphragm, the user's lip modulates the airflow, thereby controlling the sound produced by the vibrating diaphragm. This call permits a person whose mouth or palate is too narrow to accommodate a conventional intra-oral diaphragm call, to produce equivalent sounds imitative of wild game, using a similar vibrating diaphragm that partially extends outside the mouth. The diaphragm may be removably mounted and may be changed by the user.

30 Claims, 13 Drawing Figures

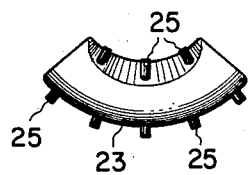
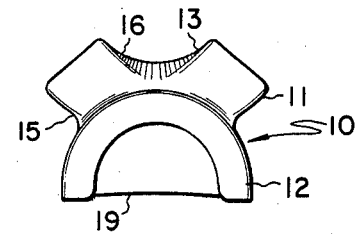
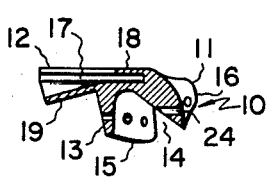
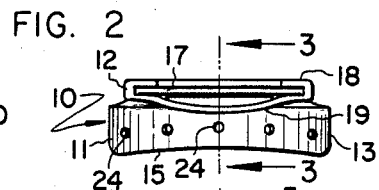
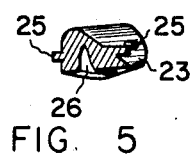
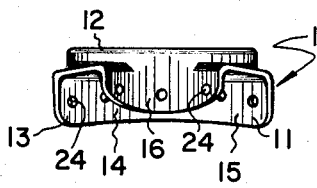
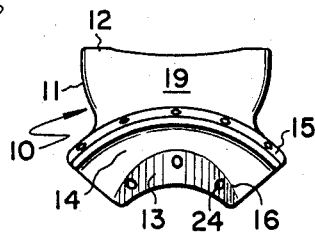
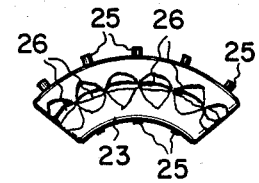
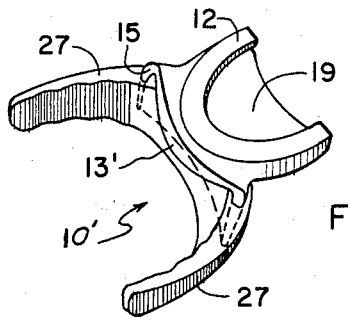
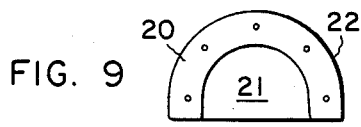
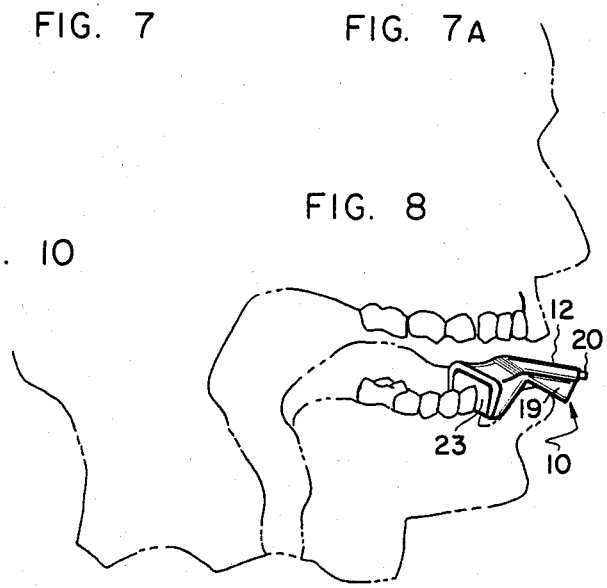

INDIVIDUALLY FITTED GAME CALL

BACKGROUND OF THE INVENTION

1. Technical Field

This invention generally pertains to a call for emulating the sound of wild game, and specifically to a game call that includes an elastic diaphragm that is caused to vibrate by air expelled from a user's mouth.

2. Background Art

An important consideration in hunting certain types of wild game is the ability of the hunter to attract the game within range of his weapon. Frequently, the only means available to the hunter to draw game into his area is to imitate a sound that will cause the animal to move from a more distant location or from a place of concealment out into the open. For this purpose, hunters have used the sound of wounded prey, the sound of the animal being hunted or of its opposite sex, and sounds of another such animal challenging the hunted animal to combat.

There are a wide variety of game call devices used to emulate such sounds. For the most part, such game calls can be divided into three major types, according to the manner of use. The first type is operated by hand, e.g. by rattling antlers together, or by scratching a piece of plastic across a slate pad mounted on a resonant cavity. A significant disadvantage of this type of call is that its operation requires one or both hands, which may encumber the hunter's ability to raise his weapon to the ready position in time to fire it. The second type call is inserted into the user's mount and produces sound when air is expelled through it, with the sound modulated partly by the internal shape of the mouth and tongue and/or by the use of one or both cupped hands around the air outlet of the call. Examples of this type are represented by the conventional duck, goose, and fox call. Like the first type call, this type call also has the disadvantage of requiring that the hands be used in producing sound imitative of wild game.

The third type of game call is inserted inside the mouth and can produce the desired sound without requiring use of the hands, thus freeing them to hold a weapon. The most common example of this type call is the diaphragm game call which comprises a thin elastic membrane stretched on a flexible horseshoe (or "U") shaped retainer. The call is placed in the roof of the user's mouth, between the upper molars. By positioning the tongue adjacent the diaphragm, airflow over the diaphragm is modulated as air is expelled from the mouth. Passage of air over the diaphragm causes it to vibrate, producing, for example, a "yelping" sound. The shape of the mouth, position of the tongue adjacent the diaphragm, and muscle tension in the mouth and throat all influence the quality of the sound produced by the call. In addition, the elasticity and thickness of the material comprising the stretched diaphragm membrane also affect the sound. Although this type call is most often used for calling wild turkeys, or gobblers, it can be used to attract other wild game, such as foxes.

One of the problems associated with the use of diaphragm type calls is the variation in the size of the palate, or roof of the mouth, among individual users. A substantial portion of the population encounters difficulty in using diaphragm game calls to produce a desired call, because they find that the call does not fit properly in the interpalatal space between their upper molar teeth. A related problem confronts people who normally wear dentures. Even where it is possible to adjust the dimensions of the call by bending the retainer to fit, the results are less than satisfactory, because the diaphragm membrane is no longer stretched taut and does not vibrate properly. Conventional diaphragm calls are generally commercially available in only one size to fit all, making it difficult for the individual who has a small palate to use a diaphragm game call. Likewise, dentures may interfere with the proper fit of a conventional diaphragm call, making it almost impossible to use.

A solution to this problem is disclosed in U.S. Pat. No. 4,218,845. This patent suggests that an individually fitted base be used to hold the diaphragm in the roof of the user's mouth, and that this base be held in place by wires protruding from each side that anchor the call in place on the adjacent teeth. The rigid base is molded to the user's mouth in much the same way that a partial denture plate is fitted, and this operation requires the services of a dentist. Considering the expense and bother of this solution, it appears somewhat impractical.

It is therefore an object of this invention to provide a simple, low cost game call that can be held in the user's mouth to produce a desired sound without the use of hands, and that may be used by anyone, regardless of the shape or size of their mouth, even if they are wearing dentures.

It is a further object to provide a game call using a diaphragm that is held adjacent the user's lip, rather than inside the mouth.

A still further object of this invention is to provide a diaphragm type game call that is individually fitted to the user, by the user, without professional assistance.

Yet a still further object is to minimize the risk that the user of the game call may ingest or choke on the diaphragm used in conjunction with the call.

These and other objects of the invention will become apparent from the description of the subject invention that follows hereinbelow and an examination of the attached drawings.

SUMMARY OF THE INVENTION

The subject invention is a wild game call adapted to be held in a user's mouth, for creating sound imitative of wild game when air is expelled from the mouth. The air passes over an elastic diaphragm, causing it to vibrate and produce sound. The call comprises a semi-rigid frame having a bite-wing portion generally conforming to the shape of the users's incisal front quadrant and having a "U" shaped channel adapted to seat on the user's incisor teeth.

The bite-wing portion of the call is joined to a diaphragm retaining portion that is adapted to receive and retain the diaphragm in a position with one surface of the diaphragm disposed adjacent the user's lip. The user's lip controls the flow of air expelled over the diaphragm to vary the vibration and the quality of the sound thereby produced by the diaphragm.

The first embodiment of the call further includes a bite-wing insert of plastic material that is retained within the bite-wing portion and is thermally molded to fit on a particular user's incisor teeth, forming impressions of those teeth within the material. During use of the call by that individual, the incisor teeth fit into the impressions in the insert and assist in holding the call in stable position adjacent the user's lip.

In the second embodiment of the call, a plastic strip is attached to the bite-wing portion, and in use extends around the facial side of the incisor teeth in a conforming arc. This strip is molded to fit the user's mouth, while seated between the lip and the teeth, thus holding the call is in stable position, with the diaphragm disposed adjacent the other lip.

BRIEF DESCRIPTION OF THE DRAWINGS

FIG. 1 is a plan view of the subject invention, in an aspect referred to herein as the "top" view.

FIG. 1A illustrates the bite-wing insert, removed from the wild game call and also viewed from the "top".

FIG. 2 is an elevational view of the call as it appears from the "front", i.e. looking at it from outside the user's mouth.

FIG. 2A shows the bite-wing insert, removed from the call, in elevational front view.

FIG. 3 is a cross-sectional view of the call, taken along section line 3—3 of FIG. 2.

FIG. 4 is a side elevational view of the wild game call.

FIG. 5 is a cross-sectional view of the bite-wing insert, taken along section line 5—5 of FIG. 2A.

FIG. 6 shows the call in elevational view from the back, i.e. looking at the portion that extends into the user's mouth.

FIG. 7 illustrates the bottom plan view of the call.

FIG. 7A shows the bottom plan view of the bite-wing insert, removed from the call.

FIG. 8 is a phantom (sectioned) view of a person's mouth, showing the call positioned as it would be held during normal use.

FIG. 9 shows a plan view of the a diaphragm used in the subject game call.

FIG. 10 is a perspective view of the second embodiment of the call.

DESCRIPTION OF THE PREFERRED EMBODIMENTS

Referring to FIGS. 1-4, 6, 7, a first preferred embodiment of the subject wild game call is illustrated, generally denoted by reference numeral 10. Call 10 has a unitary semi-rigid frame 11, molded of acrylic plastic. Other types of plastics or other materials would be equally applicable for this purpose, so long as the material is non-toxic and chemically inert with regard to liquids found in the mouth.

Frame 11 includes a generally planar portion 12 joined to a "bite-wing" portion 13. The bite-wing portion 13 includes a generally "U" shaped channel 14 that extends in an arc from one side of the call to the other. Walls 15 and 16 define the sides of channel 14, with the separation between the walls being greatest (approximately 1.3 cm) at the opening into the channel. This dimension was determined by measuring the curvature of the incisal front quadrant of a representative sampling of people to determine a width for channel 14 that would fit over the incisal front quadrant of a majority of the general population. Wall 16 runs along the inner side, and wall 15 along the outer side of the arc formed by channel 14. The opening into channel 14 is directed away from planar portion 12, with wall 15 almost perpendicular to portion 12.

A groove 17 extends in an arc around the periphery of planar portion 12. The arcs formed by wall 15 and bottom of groove 17 face in opposite directions, with the median of groove 17 overlying the median of channel 14 near the center of call 10. A lip 18 defines the upper planar side of groove 17; the other side of groove 17 extends in a slightly concave layer 19 across the arc. Layer 19 is concave so that it extends away from the plane defined by groove 17. This provides clearance between the center of the layer and a diaphragm 20 which is inserted, and retained by friction, within groove 17.

Diaphragm 20 is generally conventional in design, comprising a thin highly elastic membrane 21 stretched between two arcuate shaped flexible strips 22. These strips may be made from a plastic material or may comprise vinyl fabric covered lead strips dimpled to hold membrane 21 in place, as shown in FIG. 9.

Diaphragm 20 is slid into groove 17 and thus mates with the planar portion 12 of call 10. Use of a groove and friction fit arrangement enables the diaphragm to be easily replaced if damaged, and to be changed if one with differing characteristics is required. Those familiar with conventional diaphragm game calls that are normally positioned in the roof of the mouth and used in conjunction with the tongue, will be aware of the variety of sounds that may be produced by calls of varying membrane thickness and elasticity. In addition, after extended use, it is recommended that diaphragm 20 be removed from groove 17, washed with clean running water, and allowed to air dry. This is both hygienically sound and extends the useful life of the diaphragm.

A bite-wing insert 23 is shown in FIGS. 1A, 2A, 5, and 7A. This insert comprises a soft plastic material that can be thermally molded at temperatures from 50° to 100° C. An example of such material is sold for use as a protective mouthpiece for sports, under the name MOUTHGUARD ™. Insert 23 is arcuate shaped, conforming generally to the shape and size of channel 14.

A person who intends to fit call 10 to his mouth, immerses insert 23 in boiling water until it softens. Insert 23 is then placed into channel 14, and as pressure is applied with the fingers, some of the material comprising insert 23 is extruded into a plurality of holes 24 disposed at spaced apart intervals along sides 15 and 16 of channel 14. Extruded tips 25 hold insert in place in channel 14. Once insert 23 is firmly seated within channel 14, the entire call 10, (without the diaphragm 20 installed) is immersed in boiling water to again soften the insert. The user then places the call into his mouth the insert centered over the lower incisal quadrant as shown in FIG. 8, and pushes down, leaving impressions 26 of his incisor teeth in the lower surface of insert 23, as shown for example, in FIG. 7A. Once the thermal plastic material comprising insert 23 has cooled, call 10 may be removed from the mouth. It is thus individually fitted to a particular person.

To use call 10, it is placed in the mouth with diaphragm 20 in groove 17 positioned below the upper lip. The lower incisor teeth fit within impressions 26 to stabilize call 10 in the position shown in FIG. 8. Air is expelled from the mouth over diaphragm 20, modulated by the upper lip. The passage of air over membrane 21 causes it to vibrate. The disposition of the tongue, muscle tension in the throat and mouth, shape of the mouth, and airflow cause the quality of sound to change, and with practice, produce a sound imitative of the desired wild game.

Use of call 10 enables anyone to use a diaphragm type call, regardless of the shape or size of the user's palate, and irrespective of whether the person is wearing dentures. Since diaphragm 20 is held in frame 11 instead of in the roof of the mouth between the molar teeth, as is the case with a conventional diaphragm call, the ability to use it is independent of the user's mouth shape. Further, it uses the lip to modulate airflow instead of the tongue, enabling someone who has difficulty in modulating airflow past a conventional diaphragm with their tongue to use call 10 with much less difficulty.

Call 10 may be modified in several ways. Concave layer 19 may be eliminated, leaving only the arcuate groove 17 to hold diaphragm 20. Layer 19 is included in the preferred embodiment because it prevents the user's lower lip from contacting diaphragm 20, which would stop it from vibrating. A further modification would be the use of a suitable adhesive to secure insert 23 within channel 14 instead of holes 24 and extruded tips 25.

The second preferred embodiment is represented by call 10', shown in FIG. 10. Call 10' is similar in the manner of use to call 10, however, it differs slightly in structure, as described herein. In call 10', the bite-wing portion 13' includes wall 15. Wall 16 is eliminated from frame 11 in the second embodiment, and therefore, so is channel 14. Wall 15 is used to support an arcuate shaped facing strip 27 of soft plastic that is thermally molded to fit around wall 15 and held in place either by extruded tips 25 that extend from each side of wall 15 into holes 24 or by a suitable adhesive. The material comprising strip 27 is the same as is used in the first embodiment for insert 23 and may be thermally molded as described above. After strip 27 is attached to wall 15, it is softened by heating in boiling water, placed between the user's lip and the facial side of the lower incisors, and then pressed against the teeth so that it conforms to their shape, taking an impression of the facial side of the incisors. Labial pressure holds call 10' in place in the mouth, with diaphragm 20 disposed adjacent the upper lip during use of the call. Call 10' is used in substantially the same manner as call 10 to produce sound imitative of wild animals.

Although call 10 is shown and described above as fitting over the lower incisor teeth, it may also be used in an inverted position if impressions 26 are made of the upper teeth and the lower lip is used to modulate airflow. The same comment applies to call 10'. In the inverted position, the call would probably not be as easy to use, since gravity would tend to cause it to drop from its position on (or adjacent) the upper incisors. These and other modifications to wild game calls 10 and 10' will be apparent to those skilled in the art, within the scope of the claims that follow hereinbelow.

I claim:

1. A wild game call, comprising: a frame, means including a bite-wing portion on said frame for adapting it to be supported and held by the user's mouth between the user's front teeth while it extends outwardly of the user's lips, and means on said frame for adapting it to retain an elastic diaphragm in a position adjacent to and exposed to contact by one of the user's lips while the frame is so supported and held, said diaphragm being made to vibrate as air is expelled from the user's mouth between said one lip and said frame and over the diaphragm, thus producing a sound imitative of wild game.

2. The wild game call of claim 1 wherein said means adapting the frame to be held conforms generally to the arcuate shape of the user's incisal front quadrant and includes a "U" shaped channel which the front teeth may enter to hold the call in the user's mouth.

3. The wild game call of claim 2, said means adapting the frame to be held further comprising a bite-wing insert that is retained within the "U" shaped channel and which seats on the user's teeth when the call is held in the user'mouth during use.

4. The wild game call of claim 3, wherein the bite-wing insert comprises a plastic material that is thermally molded to fit on the user's incisor teeth, forming impressions thereof, and wherein during use, the user's teeth fit within the incisor impressions of the bite-wing insert to assist in holding the call in stable position adjacent the user's lip.

5. The wild game call of claim 1 wherein said means adapting the frame to retain a diaphragm include a groove having an arcuate shape, the ends of the arc formed by the groove being disposed at opposite sides of the mouth and the opening into the groove being directed outwardly from the mouth when the call is in use, said groove being operative to retain the diaphragm in a position adjacent the user's lip.

6. The game call of claim 1 wherein the diaphragm used with the call comprises a thin elastic sheet mounted on a generally planar arcuate shaped strip.

7. The wild game call of claim 2, wherein said means adapting the frame to be held is arcuate shaped and is fitted to the user's lower incisor teeth, and the frame is adapted to have the upper lip overhang the diaphragm for modulating airflow past it.

8. The wild game call of claim 2, wherein said means adapting the frame to be held is arcuate shaped and is fitted to the user's upper incisor teeth, and the frame is adapted to have the lower lip disposed below the diaphragm for modulating airflow past it.

9. The wild game call of claim 1, wherein said said means adapting the frame to be held is arcuate shaped, generally conforming to the curve of a person's incisal front quadrant, and includes a soft facing strip for extending around said curve at least on its inner side, such that during use of the call, the strip rests against the facial surface of the incisor teeth, between the teeth and the lip.

10. The wild game call of claim 9 wherein the facing strip comprises a plastic material that is thermally molded to fit the facial surface of the incisor teeth of a particular user, and thus to hold the call in stable position adjacent the user's lip.

11. The wild game call of claim 9 wherein the soft facing strip is fitted to the user's lower front incisor teeth, and the frame is adapted to have the upper lip overhang the diaphragm for modulating airflow past it.

12. The wild game call of claim 9 wherein the soft facing strip is fitted to the user's upper front incisor teeth, and the frame is adapted to have the lower lip disposed adjacent the diaphragm for modulating airflow past it.

13. A wild game call adapted for insertion in a user's mouth, for creating sound imitative of wild game through the vibration of an elastic diaphragm as air is expelled from the mouth over the diaphragm, said call comprising: a semi-rigid frame having means including a bite-wing portion generally conforming to the arc of the user's incisal front quadrant for adapting the frame to seat on the user's incisor teeth, said bite-wing portion being joined to a diaphragm retaining portion having means for adapting the frame to receive and retain the diaphragm in a position with one surface of the diaphragm disposed adjacent to and exposed to contact by the user's lip, whereby the user's lip may control the flow of air expelled over the diaphragm to vary the vibration and quality of the sound thereby produced by the diaphragm.

14. The wild game call of claim 13 wherein the bite wing portion includes a channel having a transverse "U" shape and a longitudinal arcuate shape conforming to the user's incisal front quadrant, said bite-wing portion being adapted to receive and retain a bite-wing insert.

15. The wild game call of claim 14, wherein the bite-wing insert comprises a plastic that softens to a moldable state at temperatures greater than 50° C. and is thus thermally molded with an impression of the user's incisor teeth, so that the incisors seat within the impressions during use of the call, and thus assist in holding the call in a stable position with the diaphragm adjacent the user's lip.

16. The wild game call of claim 15, wherein the sides of the "U" shaped channel include a plurality of spaced apart apertures, and wherein the material comprising the bite-wing insert is thermally molded to extend into the apertures, thus retaining the insert within the channel.

17. The wild game call of claim 14, wherein the bite-wing insert is retained within the "U" shaped channel by means of an adhesive.

18. The wild game call of claim 13 wherein said means for adapting the frame to seat on the user's teeth further comprise a soft facing strip attached to the bite-wing portion, extending around the arc at least on its inner side, such that during use of the call, the strip is adapted to rest against the facial surface of the incisor teeth, between said teeth and the lip.

19. The wild game call of claim 18 wherein the facing strip comprises a plastic material that is thermally molded to fit the facial surface of the incisor teeth of a particular user, and thus to hold the call in stable position adjacent the user's lip.

20. The wild game call of claim 13 wherein the diaphragm receiving and retaining means include a groove extending generally in an arc around part of its periphery, the ends of the arc being disposed at opposite sides of the mouth and the opening into the groove being directed outwardly from the mouth when the call is in use, said diaphragm being retained within the groove in an exposed position adjacent the user's lip.

21. The wild game call of claim 13 wherein the diaphragm used with the call comprises a thin highly elastic planar sheet mounted between two generally planar arcuate shaped strips.

22. The wild game call of claim 13 wherein the bite-wing portion is fitted to the user's lower incisor teeth, and the frame is adapted to have the upper lip overhang the diaphragm for modulating airflow past it.

23. The wild game call of claim 13 wherein the bite-wing portion is fitted to the user's upper incisor teeth, and the frame is adapted to have the lower lip disposed adjacent the diaphragm for modulating airflow past it.

24. A wild game call adapted for insertion in a user's mouth, for creating sound imitative of wild game through the vibration of an elastic diaphragm as air is expelled from the mouth over the diaphragm, said call comprising: means including a molded plastic frame having a bite-wing portion generally conforming to the arc of the user's incisal front quadrant, said means further including a portion attached to said bite-wing portion and individually fitted to a particular user's incisor teeth, said bite-wing portion being joined to a generally planar portion including a groove extending generally in an arc around part of its periphery, the ends of the arc of said groove being disposed near each corner of the mouth and the opening into the groove being directed outwardly from the mouth when the call is in use, said groove being operative to receive and retain the diaphragm in a median position between the user's lips, with one surface of the diaphragm disposed adjacent to and exposed to contact by the user's lip, whereby the user's lip may control the flow of air expelled over the diaphragm to vary the vibration and the quality of the sound produced by the diaphragm.

25. The wild game call of claim 24 wherein the bite-wing portion includes a generally arcuate "U" shaped channel with the open side of the channel facing away from the diaphragm retaining portion, said bite-wing portion further including a bite-wing insert disposed within said channel.

26. The wild game call of claim 25, wherein the bite-wing insert comprises a plastic that softens to a moldable state at a temperature in the range 50° to 100° C., and while soft, is adapted to be molded with an impression of said particular user's incisor teeth, said impression being seated on said teeth while the call is in use, thus holding the call in a stable position with the diaphragm adjacent the user's lip.

27. The wild game call of claim 26, wherein the sides of the "U" shaped channel include a plurality of spaced apart apertures, and wherein the material comprising the bite-wing insert is extruded into the apertures when the insert is molded to fit the particular user's incisor teeth, and the insert is thus retained within the channel.

28. The wild game call of claim 25, wherein the bite-wing insert is retained within the "U" shaped channel by means of an adhesive.

29. The wild game call of claim 24, said individually fitted means further comprising a soft facing strip in which the bite-wing portion is imbedded, said strip extending around the arc on both sides of the bite-wing portion, such that during use of the call, the strip is adapted to rest between the facial surface of the incisor teeth and the lip.

30. The wild game call of claim 29 wherein the facing strip comprises a plastic material that softens to a moldable state at a temperature in the range 50° to 100° C., and while soft, is adapted to be thermally molded to fit the facial surface of the incisor teeth of a particular user, and thus during use of the call is operative to hold the call in stable position adjacent the user's lip.

* * * * *